United States Patent
Izumi et al.

[11] Patent Number: 5,859,824
[45] Date of Patent: Jan. 12, 1999

[54] DIGITAL DISK PLAYER

[75] Inventors: Sachihiro Izumi, Iwaki; Hideo Kurohara, Kobe, both of Japan

[73] Assignee: Alpine Electronics, Inc., Tokyo, Japan

[21] Appl. No.: 865,479

[22] Filed: May 29, 1997

[30] Foreign Application Priority Data

Jun. 3, 1996 [JP] Japan .................................. 8-139851
Jun. 3, 1996 [JP] Japan .................................. 8-139852

[51] Int. Cl.$^6$ ............................................. G11B 7/00
[52] U.S. Cl. ............................ 369/58; 369/54; 369/47
[58] Field of Search ................................ 369/58, 47, 48, 369/49, 50, 54, 53, 60, 59, 32, 44.27, 44.25, 44.24, 44.34

[56] References Cited

U.S. PATENT DOCUMENTS

| | | | |
|---|---|---|---|
| 5,329,510 | 7/1994 | Tsuyuguchi et al. | 369/47 |
| 5,414,684 | 5/1995 | Nonaka et al. | 367/47 |
| 5,566,144 | 10/1996 | Shinada | 369/32 |
| 5,665,957 | 9/1997 | Lee et al. | 369/44.24 X |
| 5,684,771 | 11/1997 | Furukawa et al. | 369/58 |
| 5,721,718 | 2/1998 | Hwang | 369/58 |

*Primary Examiner*—Muhammad N. Edun
*Attorney, Agent, or Firm*—Brinks Hofer Gilson & Lione

[57] ABSTRACT

A method for identifying a disk loaded in a digital disk player as being either a single layer disk or a dual layer disk, and for setting a predetermined servo gain with respect to reproduction from each of two signal recording layers of a dual layer disk to achieve accurate servo control. The player counts the number of S curves occurring in a focus error signal generated during a focus search, and a system controller identifies the disk as being a dual layer disk or a single layer disk on the basis of the number of S curves or, alternatively, on the basis of the amplitude of the focus error signal. After a dual layer disk loaded in the player, the system controller determines servo gain coefficients with respect to first and second signal recording layers of the disk on the basis of signal amplitudes read from the signal recording layers, and stores the servo gain coefficients in a memory. At the time of reproduction, the system controller controls a servo gain by setting in a gain control section the stored servo gain coefficient corresponding to a selected one of the signal recording layers from which recording data is to be reproduced.

20 Claims, 6 Drawing Sheets

DIGITAL DISK PLAYER

BACKGROUND OF THE INVENTION

1. Field of the Invention

The present invention relates to a digital disk player and, more particularly, to a digital disk player which reproduces a record by reading from a dual layer disk having two signal recording layers or from a single layer disk having only one signal recording layer, and in which servo gain is controlled when reading from a dual layer disk.

2. Description of the Related Art

There are two types of disks for use with digital video disk (DVD) players: a single layer disk having only one signal recording layer and a dual layer disk having two signal recording layers. FIG. 4A shows the structure of a single layer disk having a signal recording layer RL, a transparent plastic layer SR (substrate) and a protective layer PL for protecting the signal layer. FIG. 4B shows the structure of a dual layer disk, which includes a dual layer structure constructed by combining two disks having signal recording layers RL1 and RL2, and transparent plastic layers (substrates) SR1 and SR2, respectively, with a spacing layer SPL interposed therebetween. In FIGS. 4A and 4B, objective lenses LS are also illustrated.

Conventional techniques for reproduction from compact disks (CDs) can be used for reproduction from single layer disks, but not from dual layer disks, because these techniques were developed without considering dual layer disk technology.

Optical disk players such as CD players, laser disk players and DVD players have a focus servo controller for converging a laser beam on a signal recording surface of a disk, and a tracking servo controller for positioning the beam at the center of a selected track formed on the signal recording surface. The focus servo controller generates a focus error signal having a voltage value which varies according to the distance between a position of an objective lens and a particular in-focus position (the position of the objective lens when the focal point of the objective lens coincides with the signal recording surface), and controls the position of the objective lens with respect to the disk so that the error signal becomes zero. The tracking servo controller generates a tracking error signal according to a deviation of the beam from the track center, and controls the beam position so that the error signal becomes zero.

It would be convenient for users if digital disk players were designed to be able to reproduce data both from single layer disks and from dual layer disks. Current digital disk players do not perform this function. Such a digital disk player design must be able to identify a disk loaded in the digital disk player as being either a single layer disk or a dual layer disk because reproduction from single layer disks and dual layer disks is based on different standards.

One type of disk read by digital disk players has a dual layer structure constructed, as shown in FIG. 7, by combining two disks having signal recording layers RL1 and RL2, respectively formed on transparent substrates SR1 and SR2, with a spacing layer SPL interposed therebetween. An objective lens LS is provided for reproduction from the disk, as shown in FIG. 7. The reflectivity of such a dual layer disk is 25 to 40%, and the first signal recording layer RL1 and the second signal recording layer RL2 have different reflectivities. The reflectivity of the first signal recording layer is smaller than that of the second signal recording layer.

Due to the different reflectivities of the first and second signal recording layers of a dual layer disk, servo error signals (focus error signal, tracking error signal) respectively reproduced from the first and second signal recording layers RL1 and RL2 differ in amplitude from each other. If the servo gain of a digital disk player is controlled by being adapted for one of the signal recording layers, then servo control cannot be performed accurately during reproduction from the other signal recording layer.

SUMMARY OF THE INVENTION

In view of the above-described problem, a first object of the present invention is to provide a method of identifying a disk loaded in a digital disk player as being either a single layer disk or a dual layer disk.

A second object of the present invention is to provide a servo gain control method which sets a predetermined servo gain with respect to reproduction from each of two signal recording layers so as to obtain a good servo characteristic.

According to the present invention, the above-described first object is achieved by performing a focus search during which the focus of an optical pickup is adjusted over a predetermined range relative to a disk, counting the number of S curves present in a focus error signal generated during the focus search, and identifying the disk as a dual layer disk or a single layer disk on the basis of the counted number of S curves.

According to the present invention, the above-described first object is alternatively achieved using a focus search circuit for causing an optical pickup to perform a focus search over a disk, and a comparison circuit for identifying the disk as a dual layer disk or a single layer disk on the basis of the amplitude of a focus error signal generated during the focus search.

According to the present invention, the above-described second object is achieved by determining a servo gain coefficient for reproduction from each of the first and second signal recording layers of a disk on the basis of a signal amplitude read from the signal recording layer after the disk has been loaded in a digital disk player, storing the servo gain coefficient in a memory, and controlling a servo gain at the time of reproduction using the stored servo gain coefficient corresponding to one of the signal recording layers from which recording data is to be reproduced.

DESCRIPTION OF THE PREFERRED EMBODIMENTS

In digital disk players, a focus servo controller is provided for the purpose of converging (focusing) a laser beam on a signal recording surface of a disk. The focus servo controller generates a focus error signal having a voltage value which is related to a distance between the actual position of an objective lens and a particular in-focus position (the position of the objective lens when the focal point of the objective lens coincides with the signal recording surface), and controls the actual position of the objective lens relative to the disk so that the error signal becomes zero.

A necessary condition for enabling the focus servo controller to perform focus servo control is that the objective lens must be positioned such that a distance between the objective lens and the signal recording surface of the disk is within a certain small range approximately equal to a depth of focus of the objective lens. Therefore, the objective lens must be moved to a focus servo enabling position to enable focus servo control when the disk is loaded in the player.

A method for positioning the objective lens in the focus servo enabling position (e.g., an in-focus position) includes controlling the position of the objective lens using a focus search signal (focus search control), and then performing focus servo control using the resulting focus error signal.

Figure 1A:
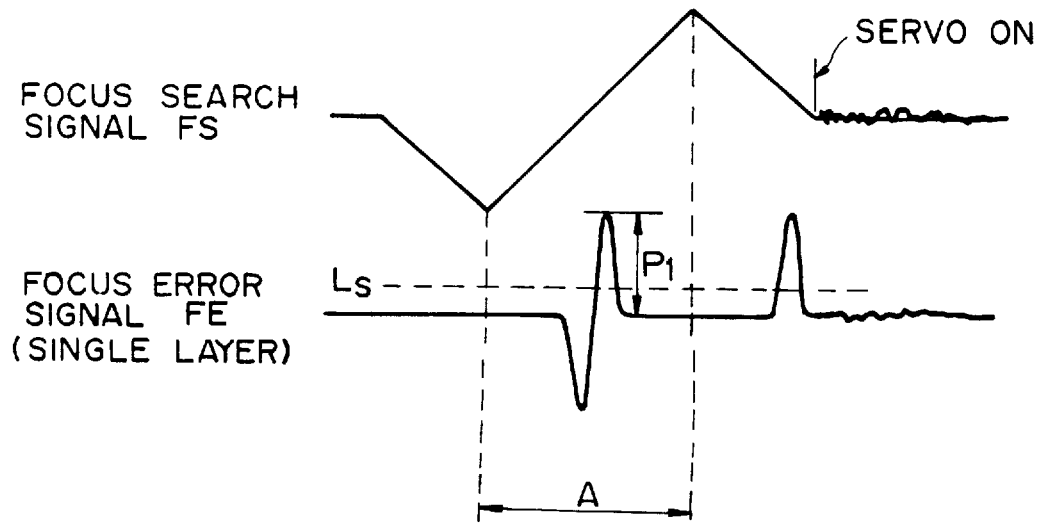
FIGS. 1A and 1B are waveform diagrams for explaining the present invention.
Figure 1B:
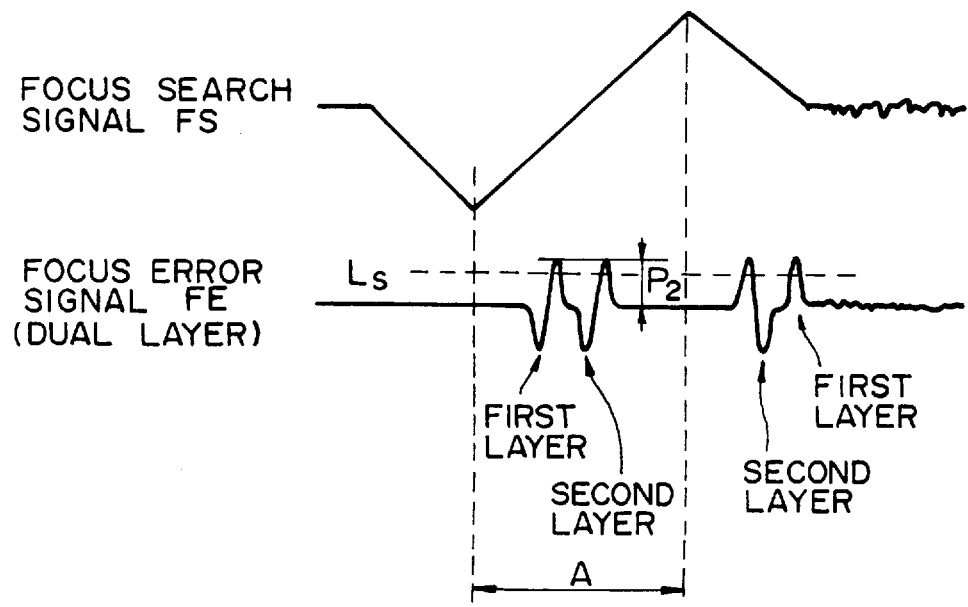

As shown in FIG. 1A, the focus search signal FS is a triangle wave signal having a frequency of about ½ Hz. When a focus search is performed for a single layer disk, a focus error signal FE having one S curve is generated during a half period A of a focus search signal FS. On the other hand, in the case of focus search performed for a dual layer disk, a focus error signal FS having two S curves is generated, as shown in FIG. 1B.

In a disk discrimination method according to a first embodiment of the present invention, a loaded disk is identified as a single layer disk when only one S curve is generated during a focus search. Conversely, the loaded disk is identified as a dual layer disk when two S curves are generated.

Single layer disks and dual layer disks differ in reflectivity from each other. Single layer disks have a reflectivity of 70% while dual layer disks have a reflectivity of 25 to 45%. Accordingly, an amplitude $P_1$ of an S curve generated during a focus search for a single layer disk is larger than an amplitude $P_2$ of an S curve detected during a focus search for a dual layer disk.

In a second disk discrimination method according to a second embodiment of the present invention, therefore, a loaded disk is identified as a single layer disk if the amplitude (peak value) of an S curve generated during a focus search is larger than a predetermined level. Conversely, the loaded the disk is identified as a dual layer disk if the amplitude of the S curve generated during a focus search is smaller than a predetermined level.

Figure 2:
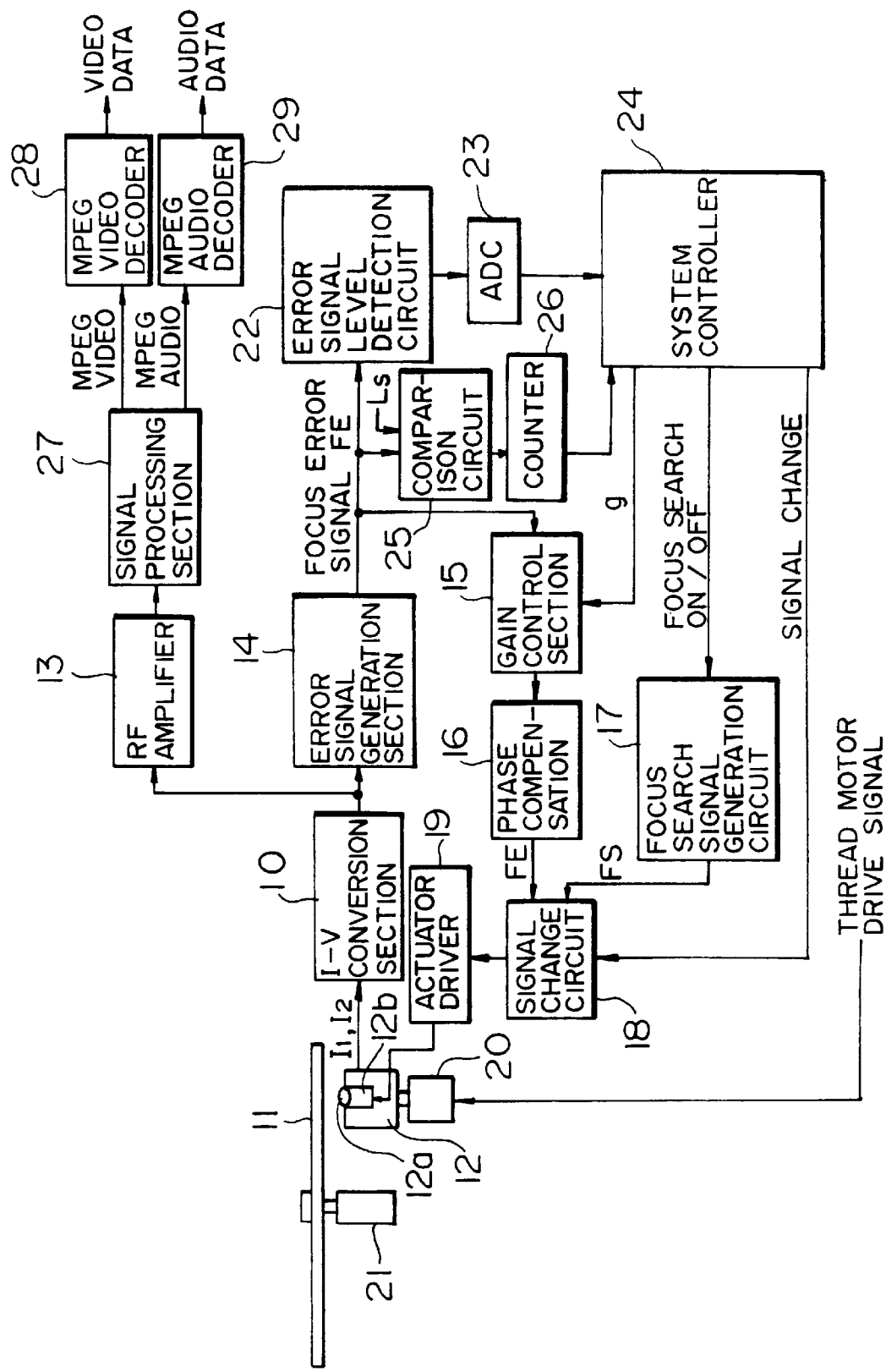
FIG. 2 is a block diagram showing essential components of a digital disk player in accordance with the first embodiment of the present invention.

FIG. 2 shows the block diagram including essential components of a digital disk player for reproducing data from a disk 11 in accordance with the first embodiment of the present invention. The disk 11 may be either a single layer disk or a dual layer disk. The player includes an optical pickup 12 having an objective lens 12a, a focus actuator 12b for positioning the objective lens 12a such that a focal point of the optical pickup 12 is adjusted in a direction perpendicular to a surface of the disk 11, and a photodiode (not shown). An I–V conversion section 10 provides current-to-voltage conversion of an output signal from the optical pickup 12. A radio frequency (RF) amplifier 13 amplifies the voltage signal generated by the I–V conversion section 10. An error signal generation section 14 generates a focus error signal FE which is determined by a voltage level of the voltage signal generated by the I–V conversion section 10.

A gain control section (e.g., an attenuator or variable gain amplifier) 15 generates a focus servo gain signal on the basis of a servo gain coefficient (described below). A phase compensation circuit 16 is provided for phase compensation of the focus servo gain signal generated by the gain control section 15. A focus search signal generation circuit 17 generates focus search signal FS. A signal change circuit 18 selects one of the focus search signal FS and the focus error signal FE, and outputs the selected signal. An actuator driver 19 drives the focus actuator 12b on the basis of the selected focus error signal FE or focus search signal FS output from the signal change circuit 18 to control the distance between the objective lens 12a and the signal recording surface of the disk 11. A thread motor 20 is provided to drive the optical pickup 12, and a spindle motor 21 is provided for driving the disk 11.

An error signal level detection circuit 22 detects the amplitude (peak value) of the focus error signal FE when the objective lens 12a passes the in-focus position associated with the one or two signal recording layers of the disk 11 in response to the focus search signal FS during focus search control. An analog-to-digital converter (ADC) 23 converts a detected focus error signal level into a digital value. A system controller 24 executes focus servo control, servo gain coefficient determination control, disk discrimination control and other functions.

A comparison circuit 25 compares the peak value Lf of focus error signal FE output from the error signal generation circuit 14 with a set level Ls during focus search control, and outputs a high-level signal when Lf>Ls. A counter 26 counts the number of high-level signals output from the comparison circuit 25 during the half period A of the focus search signal FS.

A signal processing section 27 demodulates Moving Picture Coding Experts Group (MPEG) data in the signal supplied from the RF amplifier 13 and performs digital signal processing, such as error correction processing, processing for separating MPEG video data and MPEG audio data and processing for extracting address information. An MPEG video decoder 28 decodes MPEG video data into video data in a desired form. An MPEG audio decoder 29 decodes MPEG audio data into pulse code modulated (PCM) audio data.

When disk 11 is loaded in the player, the system controller 24 controls the focus search signal generation circuit 17 to generate focus search signal FS which is the triangle wave having a frequency of ½ Hz, as shown in FIG. 1A and 1B. The objective lens 12a is alternatively moved closer to or moved away from the disk surface in accordance with the focus search signal FS. The error signal level detection circuit 22 detects a peak level $P_1$ or $P_2$ (see FIG. 1A or 1B) when the objective lens 12a passes the in-focus position with respect to one signal recording layer. The system controller 24 determines a servo gain coefficient g on the basis of the detected peak level $P_1$ or $P_2$ such that the gain of the servo loop is maximized. The system controller 24 transmits the determined servo gain coefficient g to the gain control section 15.

In parallel with the gain determination control, the comparison circuit 25 compares the level Lf of the focus error signal FE with the set level Ls, and outputs a high-level signal when Lf>Ls. The counter 26 counts the number of high-level signals produced during the half period A of the focus search signal FS. If the disk 11 is a single layer disk, then the relationship Lf>Ls is satisfied only one time during the half period A of focus search signal FS, as shown in FIG.

1A. Correspondingly, the count value of the counter 26 at the end of the half period A is 1. On the other hand, if the disk 11 is a dual layer disk, the relationship Lf>Ls is satisfied two times during the half period A of focus search signal FS, as shown in FIG. 1B. Correspondingly, the count value of the counter 26 at the end of the half period A is 2. The system controller 24 reads the value counted by the counter 26 during the half period A of focus search signal FS, and determines that the disk is a single layer disk if the count value is 1, or that the disk is a dual layer disk if the count value is 2. The system controller 24 stores the result of this determination and thereafter performs reproduction control using the standard established for the detected type of disk.

After the completion of the above-described gain control and disk discrimination control, the objective lens 12a is further moved by the focus search signal FS. Then, when focus error signal FE becomes zero again, the system controller 24 controls the signal change circuit 18 so that the signal change circuit 18 inputs focus error signal FE to the actuator driver 19 instead of focus search signal FS, thereby starting focus servo control.

Figure 3:
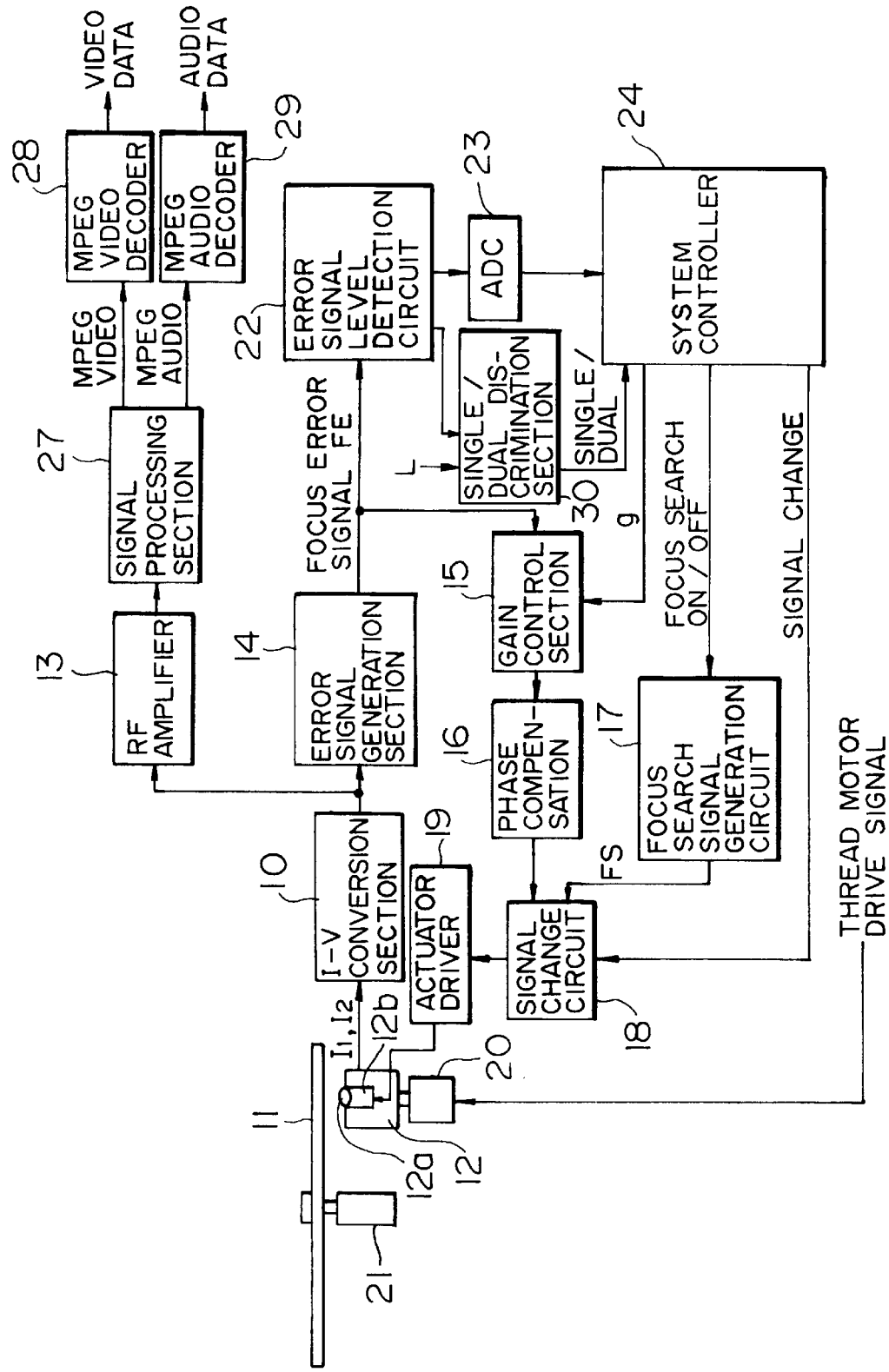
FIG. 3 is a block diagram showing essential components of a digital disk player in accordance with a second embodiment of the present invention.
Figure 4A:
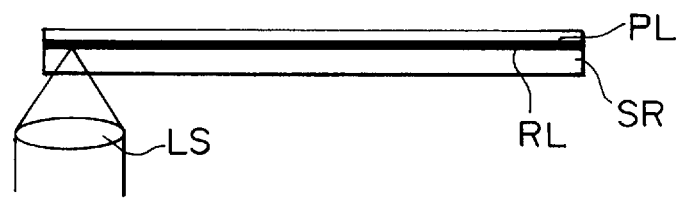
FIGS. 4A and 4B are side views showing the structures of a single layer disk and a dual layer disk, respectively.
Figure 4B:
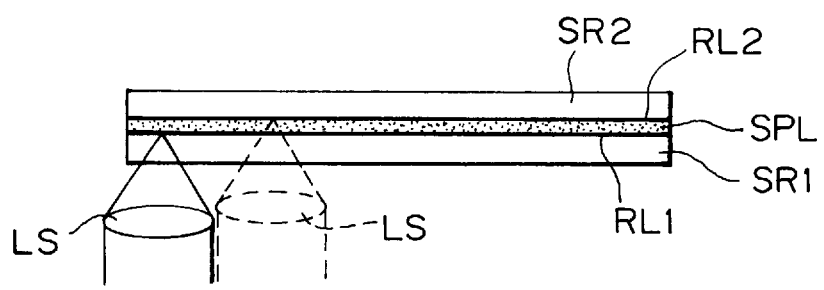

FIG. 3 shows the block diagram including essential components of a digital disk player for reproducing data from a disk 11 in accordance with the second embodiment of the present invention. Components of the second embodiment corresponding or identical to those of the first embodiment are indicated by the same reference numerals. The second embodiment differs from the first embodiment in that the second embodiment includes a single/dual discrimination section 30 for determining the type of disk on the basis of a peak value of the focus error signal FE, in place of the comparison circuit 25 and the counter 26 of the first embodiment.

As described above with reference to FIGS. 1A and 1B, single layer disks and dual layer disks differ in reflectivity from each other, and single layer disks have a reflectivity of 70% while dual layer disks have a reflectivity of 25 to 45%. Therefore, the amplitude (peak level) $P_1$ of an S curve generated during a focus search (i.e., during the half period A of focus search signal FS) of a single layer disk is larger than the amplitude $P_2$ of an S curve generated during a focus search of a dual layer disk. The single/dual discrimination section 30 compares the amplitude value of the S curve detected by the error signal level detection circuit 22 during a focus search with a set level L, and determines that the disk 11 is a single layer disk if the amplitude value is higher than the set level L, or that the disk 11 is a dual layer disk if the amplitude value is not higher than the set level L. The system controller 24 stores the result of this determination and thereafter performs reproduction control using the standard established for the detected type of disk.

The above-described second embodiment of the invention avoids the need to move the objective lens over a large distance during the focus search, as required in the first embodiment, and the servo system may be turned on when the first S curve is detected, thereby reducing the search time.

In the above-described second embodiment, a single/dual discrimination section 30 is disclosed to determine the type of disk mounted in the player. Alternatively, the single/dual discrimination section 30 may determine the type of disk simultaneously with determination of a servo gain coefficient g made by the system controller 24 based on the amplitude value input from the error signal level detection circuit 22.

Figure 5:
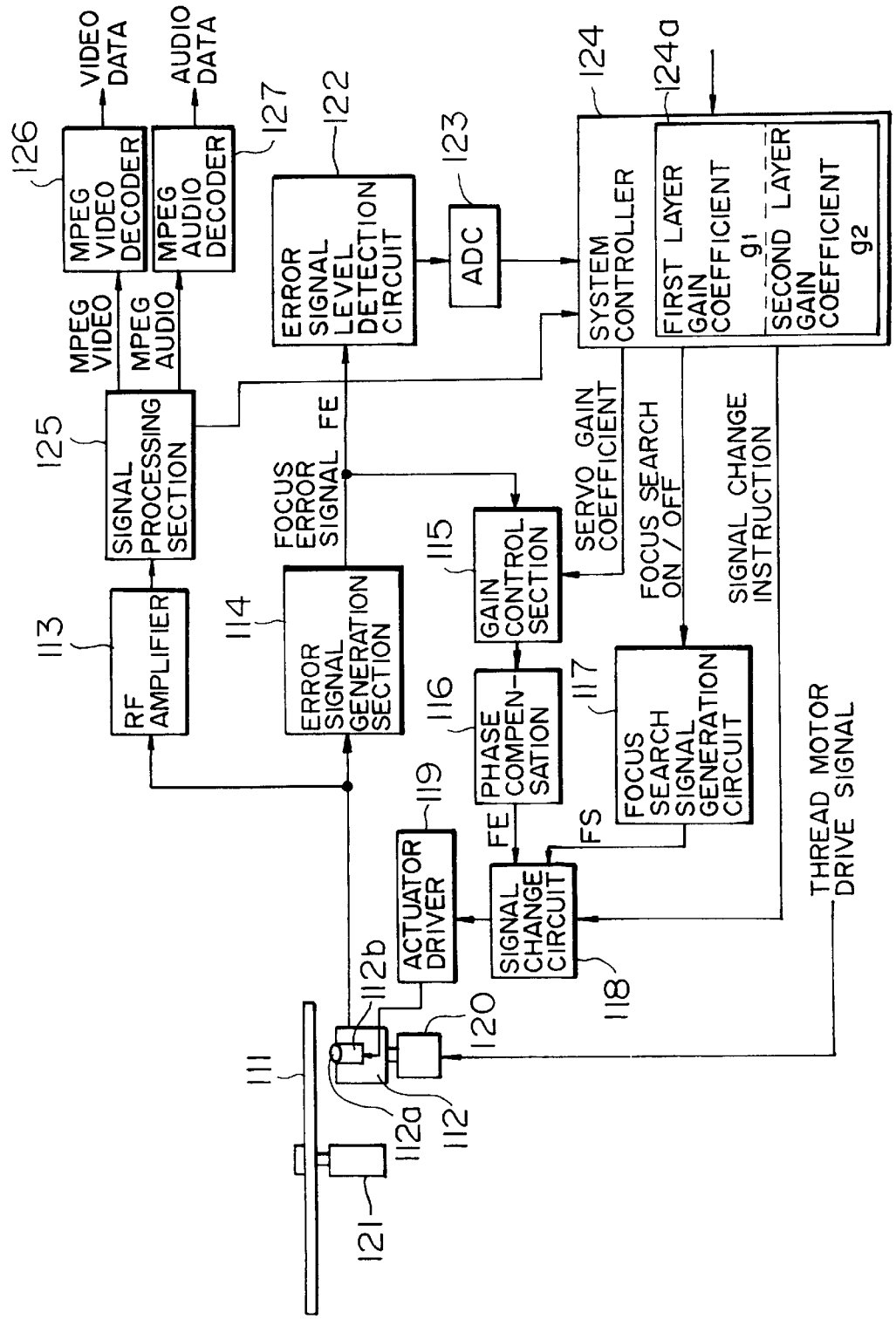
FIG. 5 is a diagram showing essential components of a digital disk player in accordance with a third embodiment of the present invention.

FIG. 5 shows the configuration of essential components of a digital disk player in accordance with the third embodiment of the present invention for determining a focus servo gain of a dual layer disk 111.

The digital disk player in accordance with the third embodiment includes an optical pickup 112 having an objective lens 112a, a focus actuator 112b for moving the position of the objective lens 112a, and a photodiode (not shown). A radio frequency (RF) amplifier 113 amplifies an output signal from the optical pickup 112. An error signal generation section 114 generates a focus error signal FE based on the signal output from the optical pickup 112. A gain control section (an attenuator or variable gain amplifier) 115 controls a focus servo gain on the basis of a servo gain coefficient (described below). A phase compensation circuit 116 is provided for phase compensation of an output from the gain control section 115. A focus search signal generation circuit 117 generates a focus search signal FS. A signal change circuit 118 selects one of the focus search signal FS and the focus error signal FE and outputs the selected signal. An actuator driver 119 drives the focus actuator 112b on the basis of the selected focus error signal FE or focus search signal FS to control the distance between the objective lens 112a and a signal recording surface of the disk 111. A thread motor 120 is provided to drive the optical pickup 112 and a spindle motor 121 is provided to for driving the disk 111.

Figure 7:
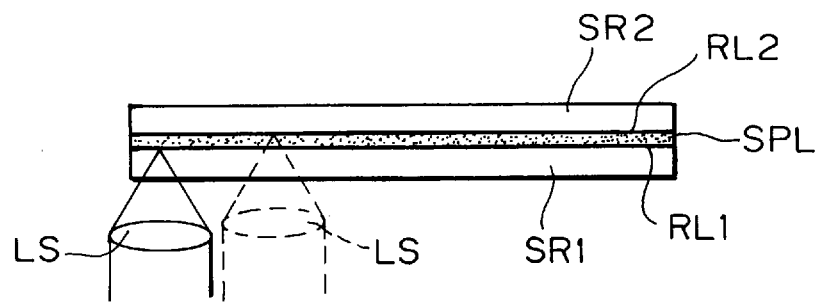
FIG. 7 is a side view showing the structure of a dual layer disk.

An error signal level detection circuit 122 detects the amplitude (peak value) of the focus error signal FE when the objective lens 112a passes the in-focus position with respect to one of first and second signal recording layers RL1 and RL2 (see FIG. 7) according to focus search signal FS during focus search control. An analog-to-digital converter (ADC) 123 converts a detected focus error signal into a digital value. A system controller 124 executes focus servo control, servo gain coefficient determination control, and other functions. A signal processing section 125 demodulates MPEG data transmitted in a signal supplied from the RF amplifier 113 and performs digital signal processing such as error correction processing, processing for separating MPEG video data and MPEG audio data, and processing for extracting address information. An MPEG video decoder 126 decodes MPEG video data into video data in a desired form. An MPEG audio decoder 127 decodes MPEG audio data into PCM audio data.

Figure 6:
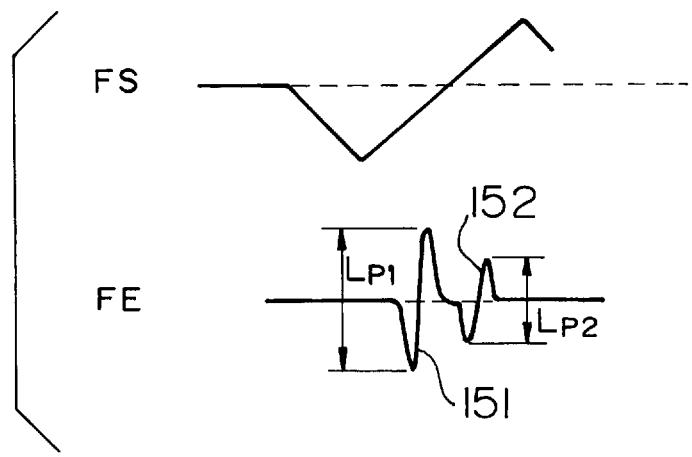
FIG. 6 is a waveform diagram for explaining servo gain coefficient determination control.

When the disk 111 is loaded in the player, the system controller 124 controls the focus search signal generation circuit 117 to generate the focus search signal FS which is a triangle wave having a frequency of ½ Hz, as shown in FIG. 6. The objective lens 112a is alternatively moved closer to or moved away from the disk surface in accordance with the focus search signal FS. The error signal level detection circuit 122 detects a peak level $L_{P1}$ (of first S curve 151) (FIG. 6) of focus error signal FE when the objective lens 112a passes the in-focus position with respect to the first signal recording layer RL1. The system controller 124 determines, on the basis of the detected peak level $L_{P1}$, a servo gain coefficient $g_1$ which is used during reproduction from the first signal recording layer RL1. The system controller 124 stores the determined servo gain coefficient $g_1$ in its internal memory 124a.

When the objective lens 112a moves further and passes the in-focus position with respect to the second signal recording layer RL2, the error signal level detection circuit 122 detects a peak level $L_{P2}$ (of second S curve 152) (FIG. 6) of focus error signal FE. The system controller 124 determines, on the basis of the detected peak level $L_{P2}$, a servo gain coefficient $g_2$ which is used during reproduction from the second signal recording layer RL2. The system controller 124 stores the determined servo gain coefficient $g_2$ in its internal memory 124a.

Thereafter, when focus error signal FE becomes zero again by a further movement of the objective lens 112a by the focus search signal FS (for example, when the first S curve 151 becomes zero), focus error signal FE is input to the actuator driver 119 instead of focus search signal FS, thereby starting focus servo control. At this time, the servo gain coefficient $g_1$ is set in the gain control section 115 to optimize the servo gain. Thereafter, each time the reproduced signal recording layer is changed, the servo gain coefficient corresponding to the signal recording layer is set in the gain control section 115.

According to the above-described method, the focus servo gain can be maximized during reproduction from each of the first and second signal recording layers RL1 and RL2, thus obtaining improved servo characteristics.

The present invention has been described with respect to an application to a focus servo system. However, it can, of course, be applied to a tracking servo system or other related system.

The present invention has been described with respect to what are presently considered to be the preferred embodiments. However, the present invention can be changed and modified in other various ways without departing from the spirit and scope of the appended claims.

According to the first embodiment of the present invention, the number of S curves in the focus error signal occurring during a focus search is counted and the loaded disk is identified as a dual layer disk or a single layer disk according to the counted number of S curves. Thus, a player according to the first embodiment of the present invention allows reliable discrimination between two types of disks using an inexpensive circuit, and enables reproduction from each type of disk. Further, because the type of a disk is determined in parallel with a focus search, the amount of operating time before a start of reproduction is reduced.

According to the second embodiment of the present invention, a disk is identified as a dual layer disk or a single layer disk on the basis of the amplitude of focus error signal generated during a focus search. Thus, the second embodiment also allows discrimination between two types of disks using an inexpensive circuit, and enables reproduction from each type of disk. Because the type of a disk is determined in parallel with a focus search, the amount of operating time before a start of reproduction is reduced. Further, large movements of the objective lens are not necessary during the focus search, thereby reducing the search time.

According to the third embodiment of the present invention, after a dual layer disk is loaded in a player, a servo gain coefficient for use during reproduction from each of first and second signal recording layers is determined on the basis of the signal amplitude read from the signal recording layer and is stored in memory, and the servo gain is controlled using the stored servo gain coefficient corresponding to the recording layer from which recording data is reproduced. Therefore, the servo gain is controlled so as to be optimized during reproduction from each of the first and second signal recording layers, thereby obtaining improved servo characteristics.

What is claimed is:

1. A disk discrimination method for a digital disk player which reads and reproduces recording data from either of a dual layer disk having two signal recording layers or a single layer disk having only one signal recording layer, said method comprising the steps of:

performing a focus search during which the focus of an optical pickup is adjusted over a predetermined range relative to a disk mounted in the digital disk player;

counting the number of S curves present in a focus error signal generated during the focus search; and identifying the disk as either of a dual layer disk or a single layer disk on the basis of the counted number of S curves.

2. A disk discrimination method for a digital disk player according to claim 1, wherein the step of performing the focus search includes transmitting a focus error signal to a driver for positioning the optical pickup, and wherein the step of identifying indicates that the disk is a single layer disk if one S curve of the focus error signal is counted during a predetermined period of a focus search signal.

3. A disk discrimination method for a digital disk player according to claim 2, wherein the predetermined period of the focus search signal is a half period.

4. A disk discrimination method for a digital disk player according to claim 1, wherein the step of performing the focus search includes transmitting a focus error signal to a driver for positioning the optical pickup, and wherein the step of identifying indicates that the disk is a dual layer disk if two S curves of the focus error signal are counted during a predetermined period of a focus search signal.

5. A disk discrimination method for a digital disk player according to claim 4, wherein the predetermined period of the focus search signal is a half period.

6. A digital disk player for reproducing a record formed on a disk, the digital disk player comprising:

an optical pickup having an objective lens and a focus actuator for moving the position of the objective lens such that a focal point of the objective lens is adjusted relative to the disk;

an error signal generation section for generating a focus error signal which is proportional to a signal output from said optical pickup;

a focus search signal generation section for generating a focus search signal;

an error signal level detection section for detecting a peak level of the focus error signal when the objective lens passes an in-focus position relative to a signal recording layer of the disk in response to the focus search signal during focus search control;

a comparison section for comparing the peak level of the focus error signal output from said error signal generation section with a preset level during focus search control, and for outputting a signal when the level of the focus error signal is higher than the preset level;

a counter for counting the number of signals output from said comparison section; and a system controller for identifying the disk as a single layer disk or a dual layer disk on the basis of a count value transmitted from said counter, and for executing focus servo control and servo gain control in response to the identification of the disk.

7. A digital disk player according to claim 6, wherein said system controller includes means for reading the value counted by the counter during a half period of the focus search signal, and for identifying the disk as a single layer disk if the count value is 1, or identifying the disk as a dual layer disk if the count value is 2.

8. A disk discrimination method for a digital disk player which reads and reproduces recording data from a disk which is either a dual layer disk having two signal recording layers or a single layer disk having only one signal recording layer, said method comprising the steps of:

performing a focus search during which the focus of an optical pickup is adjusted over a predetermined range relative to a disk mounted in the digital disk player; and identifying the disk as a dual layer disk or a single layer disk on the basis of the amplitude of a focus error signal generated during focus search.

9. A disk discrimination method for a digital disk player according to claim 8, wherein the amplitude of the focus error signal generated during focus search is related to a reflectivity of the disk.

10. A digital disk player for reproducing a record formed on a disk, the digital disk player comprising:

an optical pickup having an objective lens and a focus actuator for moving the position of the objective lens such that a focal point of the objective lens is adjusted relative to the disk;

an error signal generation section for generating a focus error signal which is proportional to a signal output from said optical pickup;

a focus search signal generation section for generating a focus search signal;

an error signal level detection section for detecting a peak level of the focus error signal when the objective lens passes an in-focus position relative to a signal recording layer of the disk in response to the focus search signal during focus search control;

a single/dual discrimination section for identifying the disk as either a single layer disk or a dual layer disk on the basis of a peak value of the focus error signal; and a system controller for executing focus servo control and servo gain control with respect to the disk on the basis of a disk identification result generated by said single/dual discrimination section.

11. A digital disk player according to claim 10, wherein said single/dual discrimination section includes a comparator for comparing the peak value of an S curve detected by said error signal detection section with a preset level when the objective lens passes the in-focus position, and means for identifying the disk as a single layer disk if the amplitude value is higher than the preset level, or identifying the disk as a dual layer disk if the amplitude value is not higher than the preset level.

12. A digital disk player according to claim 10, wherein said system controller includes means for storing, in a predetermined memory, the disk identification result supplied from said single/dual discrimination section.

13. A servo gain control method for a digital disk player which reads and reproduces recording data from a dual layer disk having first and second signal recording layers, said method comprising the steps of:

determining a servo gain coefficient for reproduction from each of the first and second signal recording layers on the basis of a signal amplitude read from the signal recording layer after the dual layer disk is loaded in the digital disk player;

storing the determined servo gain coefficient for each of the first and second signal recording layers in a memory; and controlling a servo gain at the time of reproduction using the stored servo gain coefficient corresponding to a selected one of the first and second signal recording layers from which recording data is to be reproduced.

14. A servo gain control method for a digital disk player according to claim 13, wherein the signal amplitude read from the first or second signal recording layer is detected according to a reflectivity of the disk.

15. A digital disk player for reproducing a record formed on a dual layer disk having first and second signal recording layers, said digital disk player comprising:

an optical pickup having an objective lens and a focus actuator for moving the position of the objective lens such that a focal point of the objective lens is adjusted relative to the disk;

an error signal generation section for generating a focus error signal which is proportional to a signal output from said optical pickup;

a focus search signal generation section for generating a focus search signal;

an error signal level detection section for detecting a level of the focus error signal when the objective lens passes an in-focus position relative to a signal recording layer of the disk in response to the focus search signal during focus search control;

an actuator driver for controlling a distance between the objective lens and a recording surface of the dual layer disk by driving the focus actuator in response to a selected one of the focus search signal and the focus error signal;

a system controller for determining a servo gain coefficient with respect to each of the first and second recording layers on the basis of the level of the focus error signal detected by said error signal level detection section; and a gain control section for controlling a servo gain on the basis of the servo gain coefficient determined by said system controller.

16. A digital disk player according to claim 15, wherein:

said error signal level detection section detects a first level of the focus error signal when the objective lens passes the in-focus position associated with the first signal recording layer;

said system controller includes determines a first servo gain coefficient for reproduction from the first signal recording layer on the basis of the detected first level;

said error signal level detection section detects a second level of the focus error signal when the objective lens moves from the in-focus position associated with the first signal recording layer to an in-focus position associated with the second signal recording layer; and said system controller determines a second servo gain coefficient for reproduction from the second signal recording layer on the basis of the detected second level.

17. A digital disk player according to claim 16, wherein the first and second levels of the focus error signal detected by said error signal level detection section are peak levels.

18. A digital disk player according to claim 16, wherein said system controller stores each of the determined first and second servo gain coefficients in a predetermined memory.

19. A digital disk player according to claim 15, wherein said servo gain coefficient is a focus servo gain coefficient and said servo gain is a focus servo gain.

20. A digital disk player according to claim 15, wherein said system controller includes means for starting focus servo operation by inputting the focus error signal to said actuator driver instead of the focus search signal when the focus error signal becomes zero during movement of the objective lens according to the focus search signal, and said system controller simultaneously sets a servo gain in said gain control section.

* * * * *

UNITED STATES PATENT AND TRADEMARK OFFICE
CERTIFICATE OF CORRECTION

PATENT NO.   : 5,859,824
DATED        : January 12, 1999
INVENTOR(S)  : Izumi et al.

It is certified that error appears in the above-indentified patent and that said Letters Patent is hereby corrected as shown below:

In the Claims

In Claim 16, line 6, delete "includes".

Signed and Sealed this

Eighth Day of June, 1999

Attest:

Q. TODD DICKINSON

Attesting Officer

Acting Commissioner of Patents and Trademarks